(12) United States Patent
Liu et al.

(10) Patent No.: US 8,917,765 B2
(45) Date of Patent: Dec. 23, 2014

(54) VIDEO ENCODING SYSTEM WITH REGION DETECTION AND ADAPTIVE ENCODING TOOLS AND METHOD FOR USE THEREWITH

(75) Inventors: Yang Liu, Richmond Hill (CA); Feng Pan, Richmond Hill (CA)

(73) Assignee: ViXS Systems, Inc., Toronto, Ontario (CA)

( * ) Notice: Subject to any disclaimer, the term of this patent is extended or adjusted under 35 U.S.C. 154(b) by 0 days.

(21) Appl. No.: 12/840,144

(22) Filed: Jul. 20, 2010

(65) Prior Publication Data

US 2012/0020407 A1    Jan. 26, 2012

(51) Int. Cl.
| | | |
|---|---|---|
| *H04N 11/02* | (2006.01) | |
| *H04N 19/124* | (2014.01) | |
| *H04N 19/127* | (2014.01) | |
| *H04N 19/154* | (2014.01) | |
| *H04N 19/61* | (2014.01) | |
| *H04N 19/156* | (2014.01) | |
| *H04N 19/17* | (2014.01) | |
| *H04N 19/186* | (2014.01) | |

(52) U.S. Cl.
CPC ..... *H04N 19/00781* (2013.01); *H04N 19/0009* (2013.01); *H04N 19/00103* (2013.01); *H04N 19/002* (2013.01); *H04N 19/00206* (2013.01); *H04N 19/0026* (2013.01); *H04N 19/00315* (2013.01)
USPC .................................. 375/240.1; 375/240.12

(58) Field of Classification Search
CPC .................................................. H04N 19/00157
USPC ....................................... 375/240.01–240.29
See application file for complete search history.

(56) References Cited

U.S. PATENT DOCUMENTS

| | | | |
|---|---|---|---|
| 2006/0171680 A1* | 8/2006 | Makino | 386/95 |
| 2010/0119157 A1 | 5/2010 | Kameyama | |
| 2011/0002385 A1* | 1/2011 | Kobayashi | 375/240.13 |

FOREIGN PATENT DOCUMENTS

| | | |
|---|---|---|
| EP | 0720385 A2 | 7/1996 |
| WO | 2008077119 A2 | 6/2008 |
| WO | 2010057038 A2 | 5/2010 |

OTHER PUBLICATIONS

IEEE Transactions on circuits and Systems for Video Technology, vol. 7, No. 2, Apr. 1997; "A Simple and Efficient Search Algorithm for Block-Matching Motion Estimation," Jianhua Lu, and Ming L. Liou.*

Menser B et al: "Face detection and tracking for video coding applications", IEEE Asilomar Conference on Signals, Systems and Computers, vol. 1, Oct. 29, 2000-Nov. 1, 2000, pp. 49-53.

(Continued)

*Primary Examiner* — Dave Czekaj
*Assistant Examiner* — Leron Beck
(74) *Attorney, Agent, or Firm* — Garlick & Markison; Bruce E. Stuckman

(57) ABSTRACT

A system for encoding a video stream into a processed video signal that includes at least one image, includes a region identification signal generator for detecting a region of interest in the at least one image and generating a region identification signal when the pattern of interest is detected. An encoder section generates the processed video signal based on the operation of a plurality of encoding tools, each having at least one encoder quality parameter. The encoder section adjusts the at least one encoding quality parameter of at least one of the plurality of encoding tools in response to the region identification signal.

16 Claims, 8 Drawing Sheets

(56) References Cited

OTHER PUBLICATIONS

Kim Wook-Joong et al: "Quality scalable coding of selected region: Its modeling and H.263-based implementation", Signal Processing. Image Communication, Elsevier Science Publishers, Amsterdam, NL, vol. 15, No. 3, Nov. 1, 1999, pp. 181-188.
Roumen Kountchev et al: "Adaptive Compression of Compound Images", IEEE International Workshop on Systems, Signals and Image Processing, and 6th EURASIP Conference Focused on Speech and Image Processing, Multimedia Communications and Services, Jun. 1, 2007, pp. 133-136.
Sawangsri T et al: "Face Segmentation Based on Hue-Cr Components and Morphological Technique", IEEE International Symposium on Circuits and Systems, May 23, 2005-May 26, 2005, pp. 5401-5404.
Jiyuan Lu et al: "A complexity adjustable algorithm for motion estimation in H.264", IEEE International Conference on Information, Communications and Signal Processing, Dec. 8, 2009, pp. 1-4.
Fan J et al: "An automatic algorithm for semantic object generation and temporal tracking", Signal Processing. Image Communication, vol. 17, No. 2, Feb. 1, 2002, pp. 145-164.
European Search Report; EP 11173415.8; Aug. 16, 2011; pp. 1-10.
Fan, et al.; An Automatic Algorithm for Semantic Object Generation and Temporal Tracking; Image Communication, Signal Processing; vol. 17, No. 2; Feb. 1, 2002; pp. 145-164.
Kim, et al.; Quality Scalable Coding of Selection Region: Its Modeling and H263-based Implementation; Image Communication, Signal Processing; vol. 15, No. 3; Nov. 1, 1999; pp. 181-188.
Menser, et al.; Face Detection and Tracking for Video Coding Applications; IEEE Asilomar Conference on Signals, Systems and Computers; vol. 1; Oct. 29, 2000-Nov. 1, 2000; pp. 49-53.
Sawangsri, et al.; Face Segmentation Based on Hue-Cr Components and Morphological Technique; IEEE International Symposium on Circuits and Systems; May 23, 2005; pp. 5401-5404.
Lu, et al.; A Complexity Adjustable Algorithm for Motion Estimation in H.264; IEEE International Conference on Information, Communications and Signal Processing; Dec. 8, 2009; pp. 1-4.
Kountchev, et al.; Adaptive Compression of Compound Images; IEEE International Workshop on Systems, Signals and Image Processing and 6th EURASIP Conference Focused on Speech and Image Processing, Multimedia Communications and Services; Jun. 1, 2007; pp. 133-136.

\* cited by examiner

VIDEO ENCODING SYSTEM WITH REGION DETECTION AND ADAPTIVE ENCODING TOOLS AND METHOD FOR USE THEREWITH

CROSS REFERENCE TO RELATED PATENTS

The present application is related to the following U.S. patent applications that are currently pending and commonly assigned:

PATTERN DETECTION MODULE, VIDEO ENCODING SYSTEM AND METHOD FOR USE THEREWITH, having Ser. No. 11/772,763, filed on Jul. 2, 2007; and PATTERN DETECTION MODULE, VIDEO ENCODING SYSTEM AND METHOD FOR USE THEREWITH, having Ser. No. 12/254,586, filed on Oct. 20, 2008; the contents of which are expressly incorporated herein in their entirety by reference thereto.

BACKGROUND OF THE INVENTION

1. Technical Field of the Invention

The present invention relates to encoding used in devices such as video encoders/codecs.

2. Description of Related Art

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to higher resolution and better picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
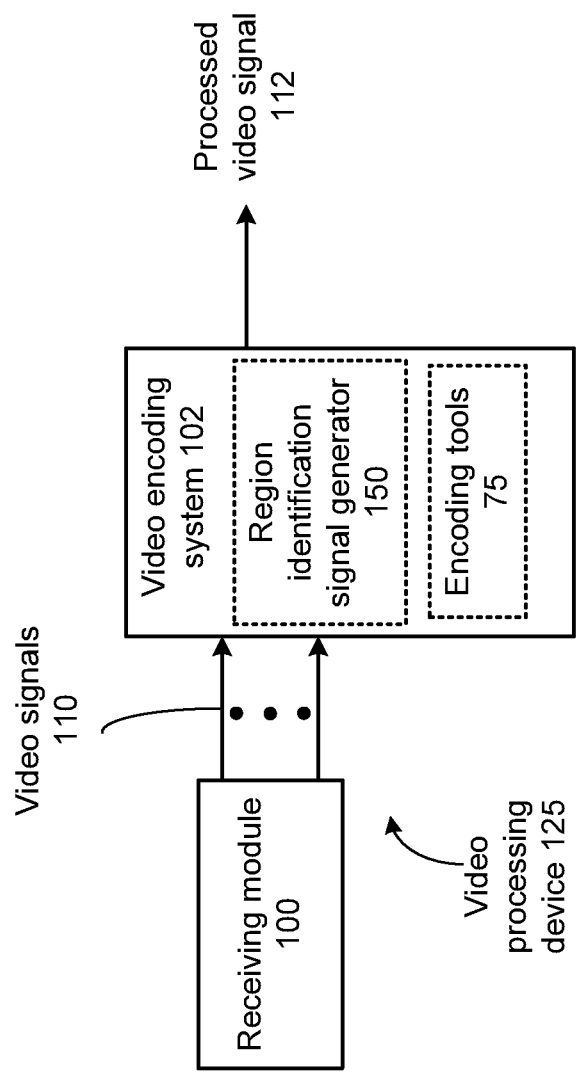
FIG. 1 presents a block diagram representation of a video processing device 125 in accordance with an embodiment of the present invention.

FIG. 1 presents a block diagram representation of a video processing device 125 in accordance with an embodiment of the present invention. In particular, video processing device 125 includes a receiving module 100, such as a set-top box, television receiver, personal computer, cable television receiver, satellite broadcast receiver, broadband modem, 3G transceiver or other information receiver or transceiver that is capable of receiving video signals 110 from one or more sources such as a broadcast cable system, a broadcast satellite system, the Internet, a digital video disc player, a digital video recorder, or other video source. Video encoding system 102 is coupled to the receiving module 100 to encode, transrate and/or transcode one or more of the video signals 110 to form processed video signal 112.

In an embodiment of the present invention, the video signals 110 can include a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, the video signals 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

The video encoding system 102 includes a region identification signal generator 150 and encoding tools 75. In particular, region identification signal generator 150 can operate via motion detection, clustering, statistical pattern recognition, syntactic pattern recognition or via other detection methodologies to detect a spatial region of interest in either a particular image (frame or field) or group of images of video signal 110 or a temporal region such as a temporal period in a sequence of images in video signal 110. In addition, the region identification signal generator 150 generates a region identification signal that identifies the detected region of interest is response thereto.

An encoder section of video encoding system 102 operates a plurality of encoding tools 75 to generate the processed video signal 112 by quantizing and digitizing with a particular image quality. When a region of interest is detected, the encoding tools are adjusted to a higher quality. For example, the encoding tools 75 can be adjusted to assign a lower quantization, higher resolution, or other higher quality to the region of interest than to portions of the at least one image outside the region to provide a higher quality image when encoding the region as opposed to portions of the image that are outside of the region. In addition, the encoding system 102 can adjust the encoding tools 75 to use a greater resolution, quantization, etc. when encoding the region of interest that it uses when the region of interest had not been detected and identified.

In this fashion, the video coding system 102 can allocate greater available computing resources and/or produce greater video quality in regions of interest, such as areas of greater visual importance—when compared with other regions of the video signal 110. For example, the head and shoulders of a person can be detected and more resources can be utilized to produce a higher quality encoding in those regions. In another example, periods exhibiting a greater degree of motion or greater complexity can also be detected and more resources can be utilized to produce a higher quality encoding during these periods. Besides visual quality improvement, the present invention can be used to optimally allocate CPU power to meet a real-time requirement. For example, when encoding a complex sequence, the processing may be slower than real-time. When the region identification signal generator 150 detects that the encoding system 102 is running slower than some real-time safety margin, a region identification signal can be generated that causes the encoder to adjust encoding quality parameters of one or more encoding tools 75 to lower the quality outside of spatial or temporal regions of interest to free computational resources.

The region identification signal generator 150 and encoding tools 75 will be described in greater detail in conjunction with many optional functions and features described in conjunction with FIGS. 2-8 that follow.

Figure 2:
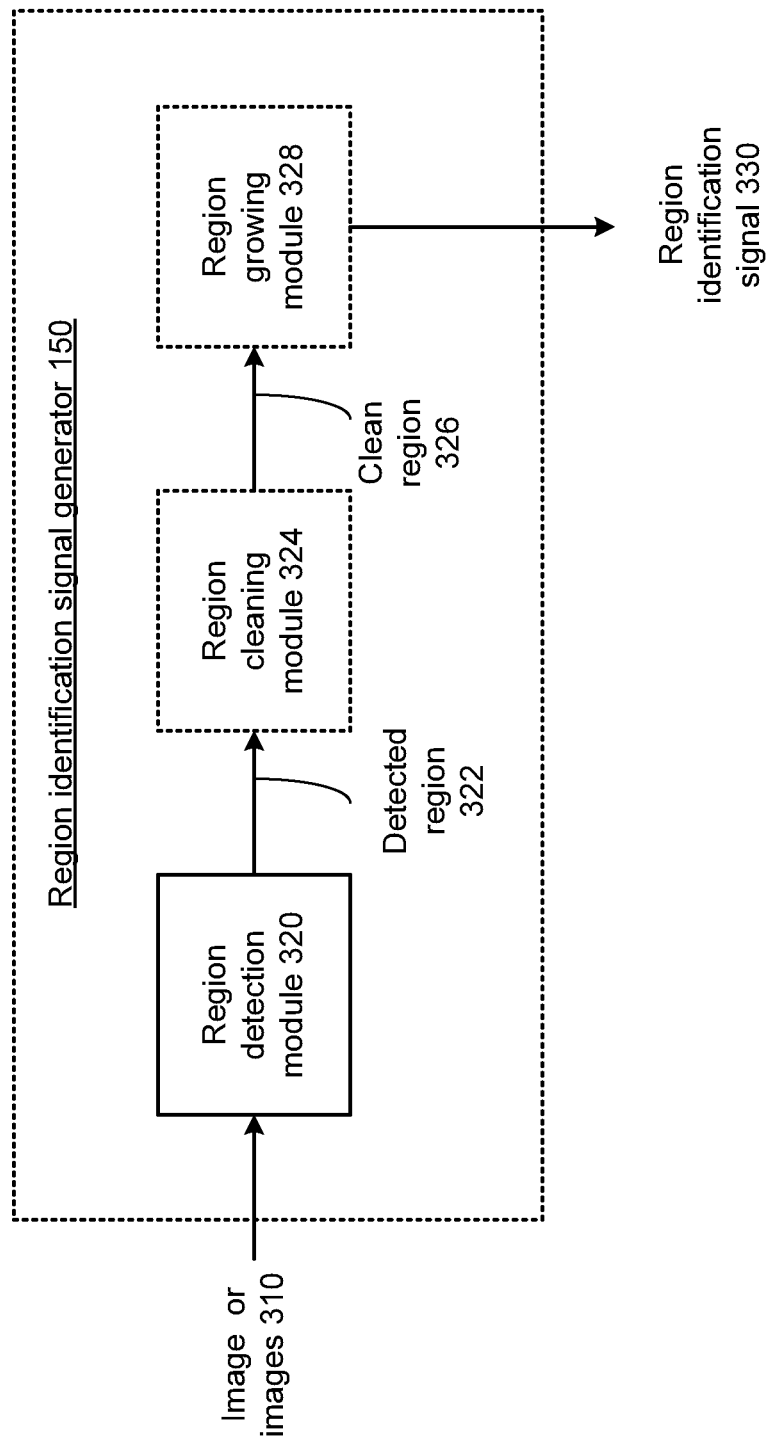
FIG. 2 presents a block diagram representation of a region identification signal generator 150 in accordance with an embodiment of the present invention.

FIG. 2 presents a block diagram representation of a region identification signal generator 150 in accordance with an embodiment of the present invention. In particular, region identification signal generator 150 includes a region detection module 320 for detecting a detected region 322 in the at least one image and wherein the region is based on the detected region. In operation, the region detection module 320 can detect the presence of a particular pattern or other region of interest that may require greater image quality. An example of such a pattern is a human face or other face, however, other patterns including symbols, text, important images and as well as application specific patterns and other patterns can likewise be implemented. Region identification signal generator 150 optionally includes a region cleaning module 324 that generates a clean region 326 based on the detected region 322, such via a morphological operation. Region identification signal generator 150 can further include a region growing module that expands the clean region 326 to generate a region identification signal 330 that identifies the region containing the pattern of interest.

Considering, for example, the case where the image 310 includes a human face and the region identification signal generator 150 generates a region corresponding the human face, region detection module 320 can generate detected region 322 based on the detection of pixel color values corresponding to facial features such as skin tones. Region cleaning module can generate a more contiguous region that contains these facial features and region growing module can grow this region to include the surrounding hair and other image portions to ensure that the entire face is included in the region identified by region identification signal 330. The encoding section can operate using region identification signal 330 to emphasize the quality in this facial region while potentially deemphasizing other regions of the image. It should be noted that the overall image may be of higher quality to a viewer given the greater sensitivity and discernment of faces.

Figure 3:
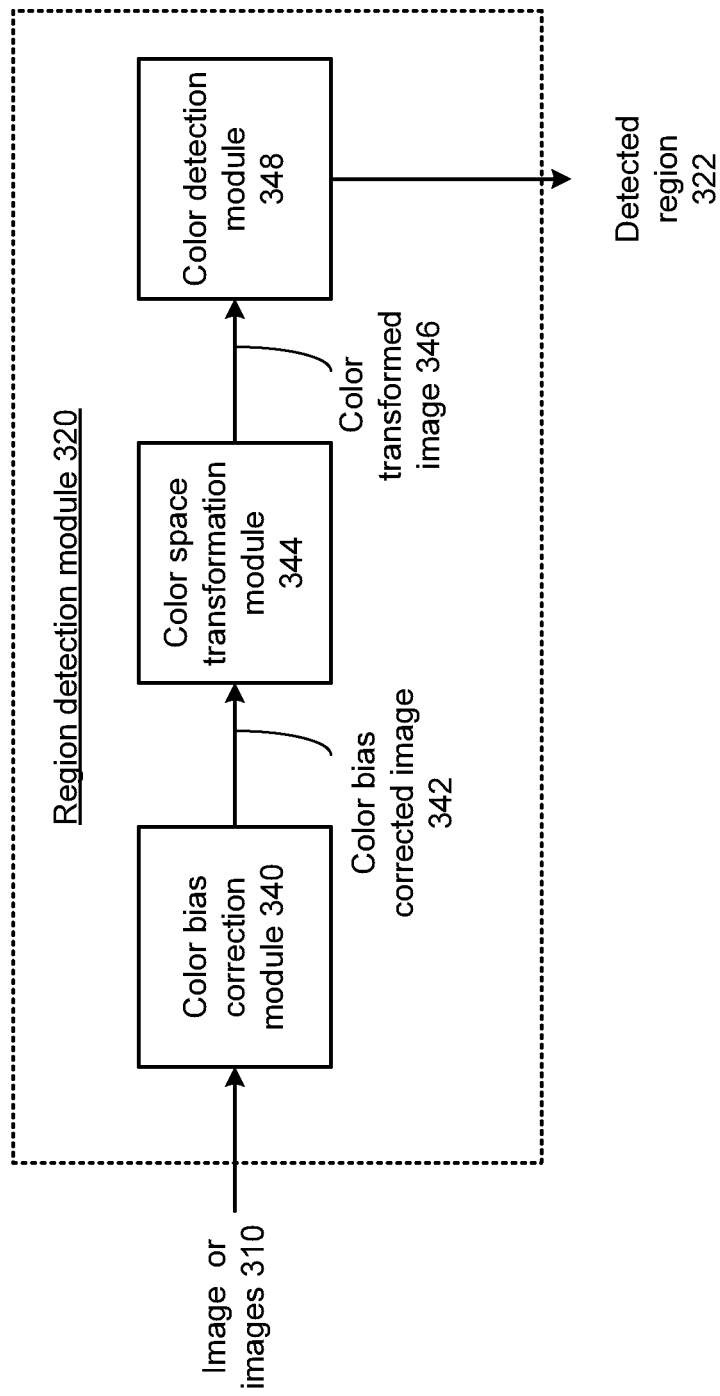
FIG. 3 presents a block diagram representation of a region detection module 320 in accordance with a further embodiment of the present invention.

FIG. 3 presents a block diagram representation of a region detection module 320 in accordance with a further embodiment of the present invention. In this embodiment, region detection module 320 operates via detection of colors in image 310. Color bias correction module 340 generates a color bias corrected image 342 from image 310. Color space transformation module 344 generates a color transformed image 346 from the color bias corrected image 342. Color detection module generates the detected region 322 from the colors of the color transformed image 346.

Figure 4:
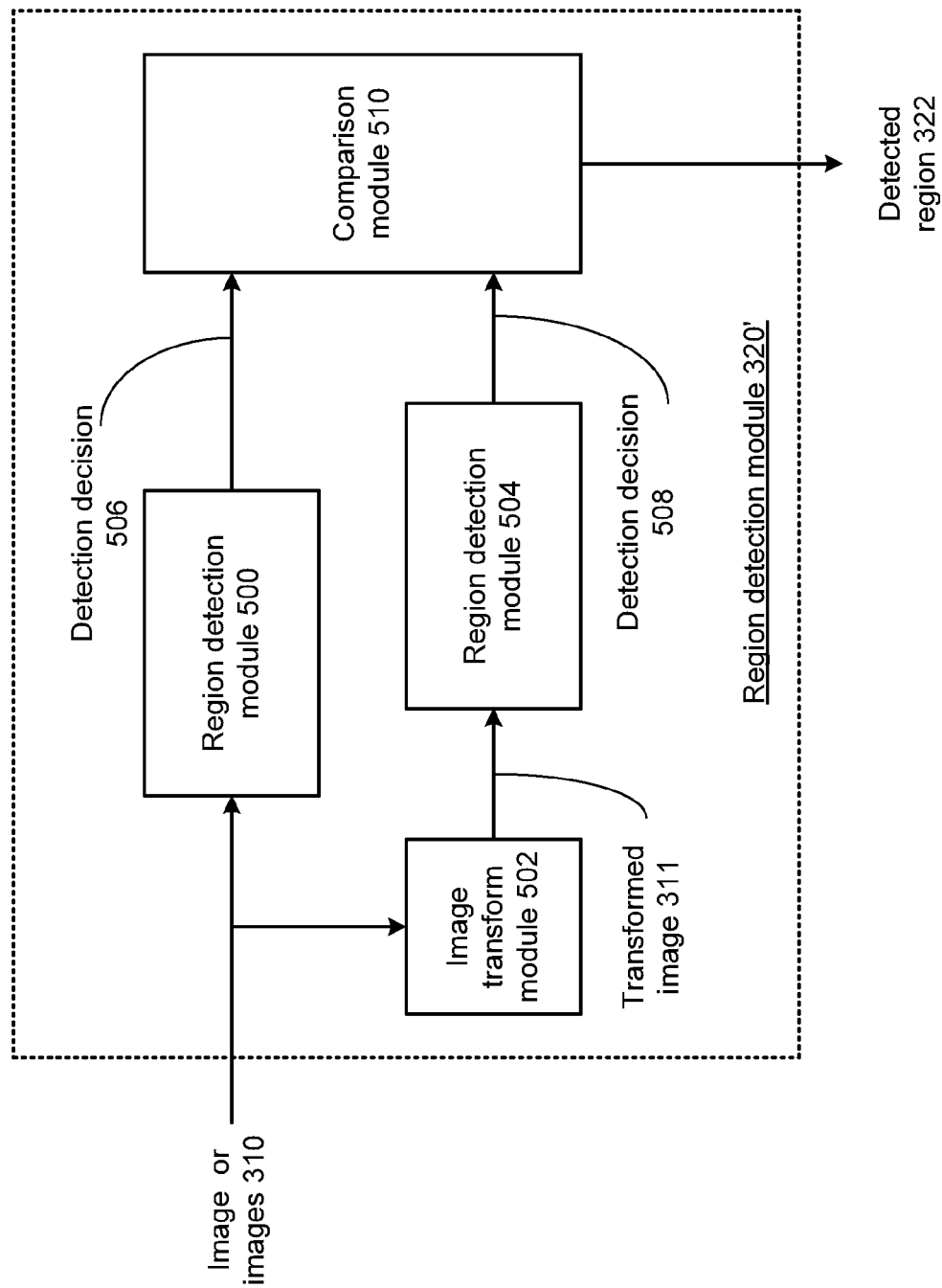
FIG. 4 presents a block diagram representation of region detection module 320' in accordance with another embodiment of the present invention.

For instance, following with the example discussed in conjunction with FIG. 4 where human faces are detected, color detection module 348 can operate to detect colors in the color transformed image 346 that correspond to skin tones using an elliptic skin model in the transformed space such as a $C_bC_r$ subspace of a transformed $YC_bC_r$ space. In particular, a parametric ellipse corresponding to contours of constant Mahalanobis distance can be constructed under the assumption of Gaussian skin tone distribution to identify a detected region 322 based on a two-dimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present invention. In a simplified approach, the modeling approach described above can be approximated using a look-up table generated based on samples of actual images. In this fashion, detection results, such as an identification of detected region 322 can be determined in a single step.

FIG. 4 presents a block diagram representation of region detection module 320' in accordance with another embodiment of the present invention. In this embodiment, an image such as image 310 is transformed into transformed image 311 in another domain. Detection is performed in the original domain of image 310 by region detection module 500 and further in the transformed domain of transformed image 311 by region detection module 504. The detection decisions 506 and 508 are compared by comparison module 510 to determine a detected region 322.

In an embodiment of the present invention, the region detection module 500 operates on image 310 in the YUV domain, in a similar fashion to region detection module 320. Image transform module 502 transforms image 310 to the RGB domain and region detection module 504 operates in the RGB domain. Comparison module 510 can signal that a region contains the pattern of interest if either the region detection module 500 or the region detection module 504 makes such a detection. In this fashion, possible performance loss in YUV modeling can be compensated by parallel detection in an alternative domain, such as the RGB domain.

Figure 5:
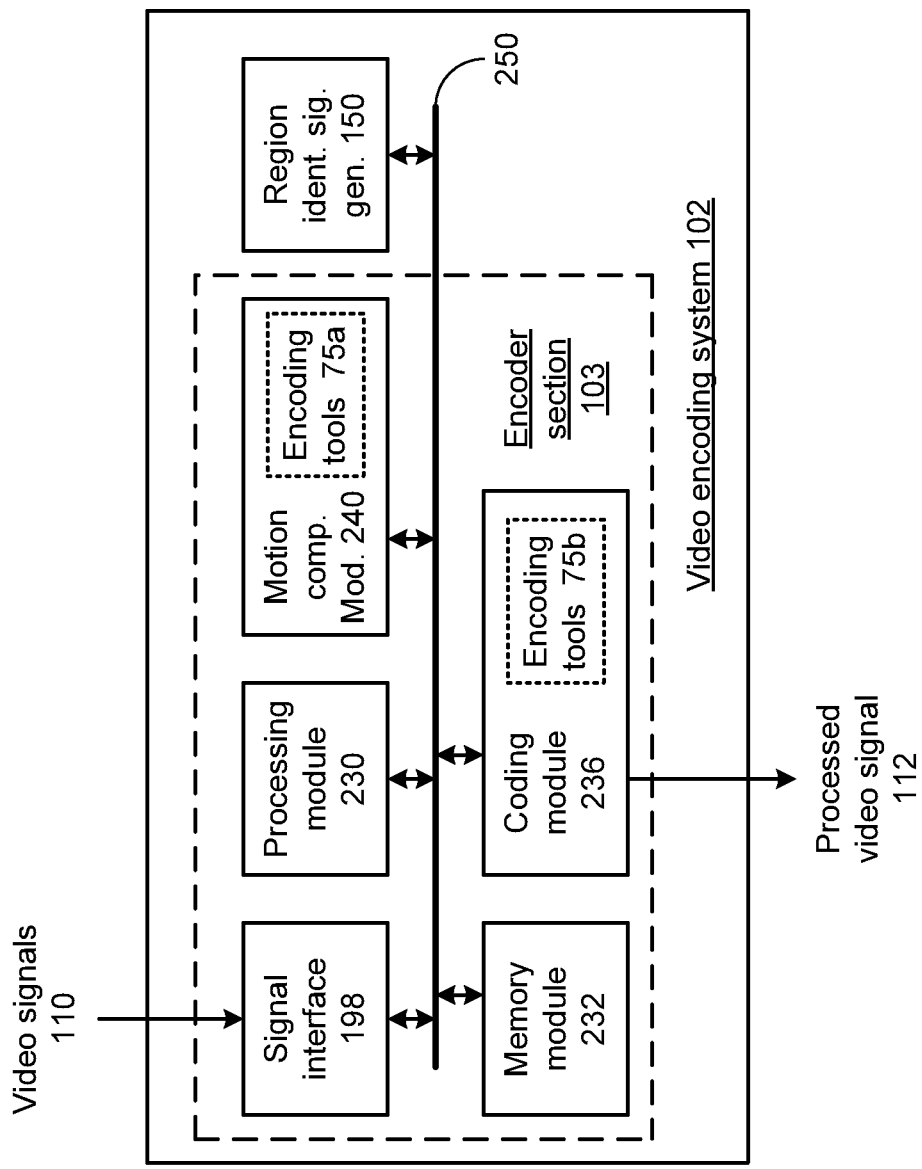
FIG. 5 presents a block diagram representation of a video encoding system 102 in accordance with an embodiment of the present invention.

FIG. 5 presents a block diagram representation of a video encoding system 102 in accordance with an embodiment of the present invention. In particular, video encoding system 102 operates in accordance with many of the functions and features of the H.264 standard, the MPEG-4 standard, VC-1 (SMPTE standard 421M) or other standard, to encode, transrate or transcode video input signals 110 that are received via a signal interface 198.

The video encoding system 102 includes an encoder section 103 having signal interface 198, processing module 230, motion compensation module 240, memory module 232, and coding module 236. The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules, such as region identification signal generator 150, motion compensation module 240 and coding module 236. The modules of video encoder 102 can be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 240 operates in a plurality of macroblocks of each frame or field of the video stream generating residual luma and/or chroma pixel values corresponding to the final motion vector for each macroblock. Coding module 236 generates processed video signal 112 by transforming coding and quantizing the residual pixel values into quantized transformed coefficients that can be further coded, such as by entropy coding in entropy coding, filtered by a de-blocking filter and transmitted and/or stored as the processed video signal 112. In a transcoding application where digital video streams are received by the encoder 102, the incoming video signals can optionally be fully or partially decoded prior to further encoding, transrating or transcoding.

In operation, motion compensation module 240 and coding module 236 include a plurality of encoding tools 75a and 75b that operate to produce a compressed video stream from one or more video signals 110. The encoding tools 75a can comprise portions of the motion compensation module 240 that operate based on encoding quality parameters such as a motion search range, a macroblock mode, a sub-pixel accuracy and/or other motion search parameters, motion refinement parameters, mode decision parameters or other motion compensation parameters that impact the quality and computational complexity of the motion compensation process. The encoding tools 75b can further comprise portions of the coding module 236 that operate based on encoding quality parameters such as a quantization parameter (QP), a quantization matrix, and/or a reference picture frequency or other coding parameter used by coding module 236 to produce processed video signal 112.

As previously discussed, when the region identification signal generator 150 generates a region identification signal, such as region identification signal 330, that indicates either a spatial or temporal region of interest has been detected, the encoder section 103 adjusts one or more of the encoding quality parameter of the encoding tools 75a and 75b to produce a higher quality encoding within the region of interest compared to portions outside the region of interest.

Figure 6:
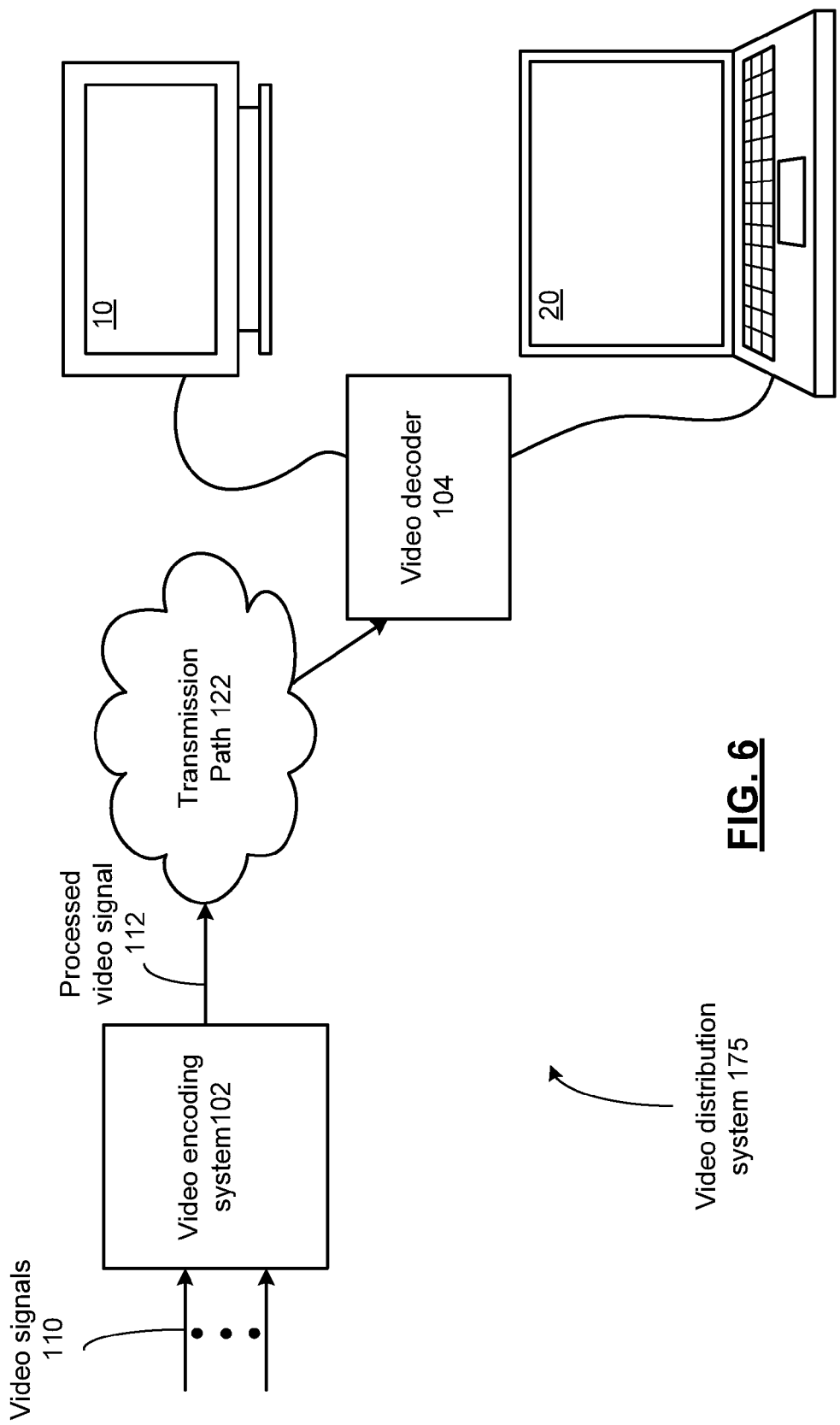
FIG. 6 presents a block diagram representation of a video distribution system 175 in accordance with an embodiment of the present invention.

FIG. 6 presents a block diagram representation of a video distribution system 175 in accordance with an embodiment of the present invention. In particular, processed video signal 112 is transmitted via a transmission path 122 to a video decoder 104. Video decoder 104, in turn can operate to decode the processed video signal for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 7:
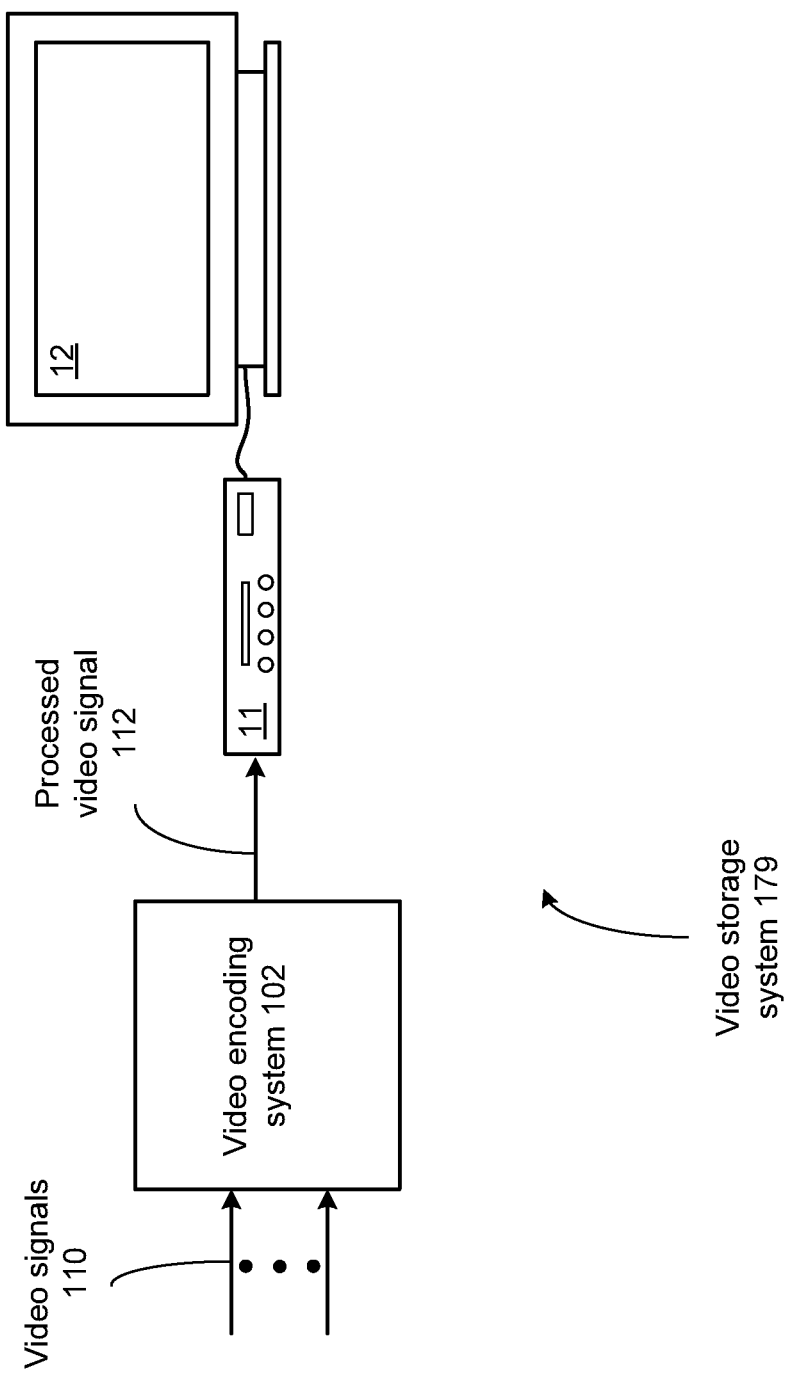
FIG. 7 presents a block diagram representation of a video storage system 179 in accordance with an embodiment of the present invention.

FIG. 7 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the combined video stream 220 in accordance with the methods and systems described in conjunction with the features and functions of the present invention as described herein.

Figure 8:
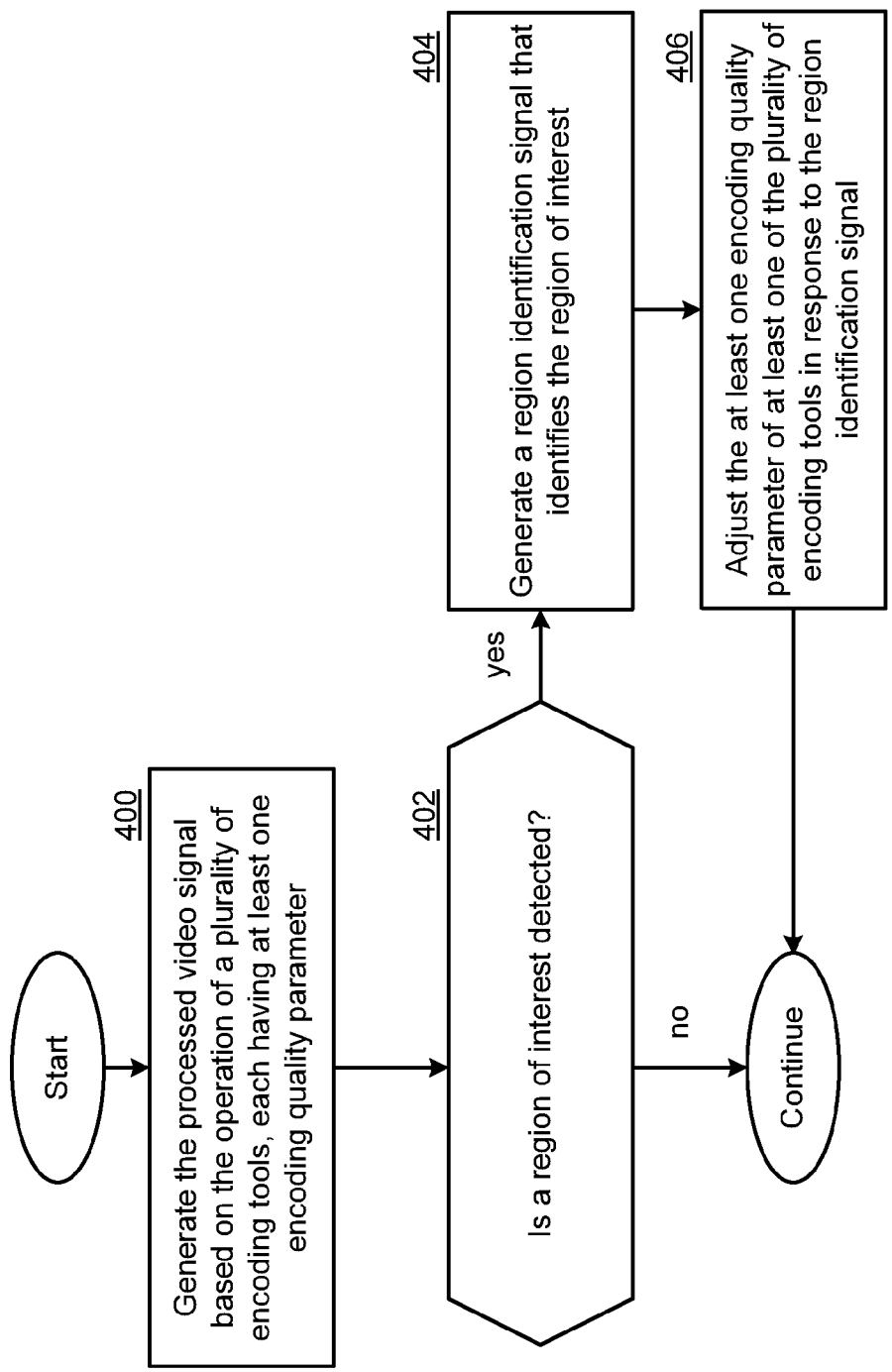
FIG. 8 presents a flowchart representation of a method in accordance with an embodiment of the present invention.

FIG. 8 presents a flowchart representation of a method in accordance with an embodiment of the present invention. In particular a method is presented for use in conjunction with one or more functions and features described in conjunction with FIGS. 1-8. In step 400, a processed video signal is generated based on the operation of a plurality of encoding tools, each having at least one encoder quality parameter. In step 402 the method determines if a region of interest in the at least one image. In step 404, a region identification signal when the pattern of interest is detected. In step 406, at least one encoding quality parameter of at least one of the plurality of encoding tools is adjusted in response to the region identification signal.

In an embodiment of the present invention, step 406 includes adjusting the at least one encoding quality parameter of the at least one of the plurality of encoding tools to produce a higher quality encoding within the region of interest compared to portions of the at least one image outside the region of interest. Step 406 can further include adjusting at least one encoding quality parameter of each of the plurality of encoding tools in response to the region identification signal.

In one mode of operation the at least one image includes a sequence of images and the region of interest includes a temporal period that spans a plurality of images in the sequence of images. The plurality of encoding quality parameters can include a quantization parameter, a quantization matrix, a motion search range, a macroblock mode, a sub-pixel accuracy and/or a reference picture frequency.

As previously discussed, an encoder section of a video encoding system, such as encoder system 102 generates a processed video signal by quantizing and digitizing with a particular image quality. When a region of interest is detected, a higher quality, such as a lower quantization, higher resolution, or other higher quality is assigned to the region of interest than to portions of the image or images outside the region. This provides a higher quality image when encoding the region as opposed to portions of the image that are outside of the region.

For instance, the encoder section uses a greater resolution, quantization, etc. when encoding macroblocks within the region that it would ordinarily use if the pattern had not been detected and the region identified. This quality variation can be implemented in different ways. For instance, in a bit allocation approach, quantization parameters and rates can be adjusted based on whether a portion of an image is inside the region of interest or outside the region of interest.

Other approaches can be used as well. For example, the computational power can be allocated to favor encoding within the region compared with encoding outside of the region. In this approach, encoding parameters such as the pre-defined motion estimate search range, sub-pixel motion estimation accuracy, the number of reference frames, and the number of macroblock mode candidates can be adjusted to increase the amount of computation used within the region of interest and/or to decrease the amount of computation used outside of the region of interest.

The present invention can be implemented, for instance, to use less bits to achieve a similar visual quality or to use the same number of bits to achieve higher visual quality. Further, the encoding process can be performed faster to achieve similar visual quality or a similar processing time can be employed to achieve greater visual quality. In this fashion the encoding process can be focused on regions of the image that matter to the user.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a video encoding system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system for encoding a video stream into a processed video signal, the video stream including at least one image, the system comprising:
   a region identification signal generator for detecting a region of interest in the at least one image and generating a region identification signal when the pattern of interest is detected; and
   an encoder section, coupled to the region identification signal generator, that generates the processed video signal based on the operation of a plurality of encoding tools, each having at least one encoding quality parameter, wherein the encoder section adjusts the at least one encoding quality parameter of at least one of the plurality of encoding tools in response to the region identification signal and wherein the at least one encoding quality parameter includes a motion search range employed in motion search to determine a motion search motion vector, wherein the motion search range is adjusted in size within a region of interest to a first value only when the region identification signal indicates the pattern of interest is detected from a second value outside the region of interest.

2. The system of claim 1 wherein, when the region identification signal indicates the region of interest is detected, the encoder section adjusts the at least one encoding quality parameter of the at least one of the plurality of encoding tools to produce a different encoding within the region of interest compared to portions of the at least one image outside the region of interest.

3. The system of claim 1 wherein the encoder section adjusts the at least one encoding quality parameter of the plurality of encoding tools in response to the region identification signal.

4. The system of claim 1 wherein at least one image includes a sequence of images and the region of interest includes a temporal period that spans a plurality of images in the sequence of images.

5. The system of claim 4 wherein the region identification signal generator includes a motion detection module for detecting an amount of motion in the sequence of images.

6. The system of claim 1 wherein the region identification signal generator includes a region detection module for detecting a face in the at least one image.

7. The system of claim 1 wherein the plurality of encoding quality parameters include at least one of: a quantization parameter, and a quantization matrix.

8. The system of claim 1 wherein the plurality of encoding quality parameters include at least one of: a macroblock mode, and a sub-pixel accuracy.

9. The system of claim 1 wherein the plurality of encoding quality parameters include a reference picture frequency.

10. A method for encoding a video stream into a processed video signal, the video stream including at least one image, the method comprising:
   generating the processed video signal based on the operation of a plurality of encoding tools, each having at least one encoder quality parameter;
   detecting a region of interest in the at least one image;
   generating a region identification signal when the pattern of interest is detected; and
   adjusting the at least one encoding quality parameter of at least one of the plurality of encoding tools in response to the region identification signal, wherein the at least one encoding quality parameter includes a motion search range employed in motion search to determine a motion search motion vector, wherein the motion search range is adjusted in size within a region of interest to a first value only when the region identification signal indicates the pattern of interest is detected from a second value outside the region of interest.

11. The method of claim 10 wherein adjusting the at least one encoding quality parameter includes adjusting the at least one encoding quality parameter of the at least one of the plurality of encoding tools to produce a different encoding within the region of interest compared to portions of the at least one image outside the region of interest.

12. The method of claim 10 wherein adjusting the at least one encoding quality parameter includes adjusting the at least one encoding quality parameter of the plurality of encoding tools in response to the region identification signal.

13. The method of claim 10 wherein at least one image includes a sequence of images and the region of interest includes a temporal period that spans a plurality of images in the sequence of images.

14. The method of claim 10 wherein the plurality of encoding quality parameters include at least one of: a quantization parameter, and a quantization matrix.

15. The method of claim 10 wherein the plurality of encoding quality parameters include at least one of: a macroblock mode, and a sub-pixel accuracy.

16. The method of claim 10 wherein the plurality of encoding quality parameters include a reference picture frequency.

* * * * *